US012686294B2

(12) United States Patent　　　　　(10) Patent No.:　US 12,686,294 B2
Edman et al.　　　　　　　　　　　　　(45) Date of Patent:　　　Jul. 21, 2026

(54) ELECTRICALLY POWERED SURFBOARD, AND A SURFBOARD BATTERY HOUSING

(71) Applicant: Ride Awake ApS, Copenhagen (DK)

(72) Inventors: Pontus Edman, Solna (SE); Viktor Berglin, Stockholm (SE); Markus Stridsberg, Stockholm (SE); Matthias Bjerkesjö Braakman, Lund (SE); Philip Sveningsson, Höllviken (SE); Martin Pråme Malmqvist, Svedala (SE)

(73) Assignee: Ride Awake ApS, Copenhagen (DK)

( * ) Notice: Subject to any disclaimer, the term of this patent is extended or adjusted under 35 U.S.C. 154(b) by 345 days.

(21) Appl. No.: 18/571,502

(22) PCT Filed: Jun. 14, 2022

(86) PCT No.: PCT/EP2022/066077
　　§ 371 (c)(1),
　　(2) Date: Dec. 18, 2023

(87) PCT Pub. No.: WO2023/274708
　　PCT Pub. Date: Jan. 5, 2023

(65) Prior Publication Data
　　US 2024/0278681 A1　　Aug. 22, 2024

(30) Foreign Application Priority Data

Jul. 1, 2021　(SE) .................................... 2150861-9
　Mar. 30, 2022　(SE) .................................... 2250391-6

(51) Int. Cl.
　　*B60L 53/80*　　　(2019.01)
　　*B63B 11/00*　　　(2006.01)
　　(Continued)

(52) U.S. Cl.
　　CPC .............. *B60L 53/80* (2019.02); *B63B 11/00* (2013.01); *B63B 32/10* (2020.02); *B63B 32/40* (2020.02);
　　(Continued)

(58) Field of Classification Search
　　CPC ...... B60L 53/80; B60L 2200/32; B63B 32/10; B63B 32/50; B63B 32/40; B63B 11/00;
　　(Continued)

(56) References Cited

U.S. PATENT DOCUMENTS 9,359,044 B2 *　6/2016　Langelaan ............... B63H 1/16
10,946,939 B1　　3/2021　Montague et al.
　　(Continued)

FOREIGN PATENT DOCUMENTS

CN　　112407161 A　　2/2021
CN　　112467273 A　　3/2021
　　(Continued)

OTHER PUBLICATIONS

International Search Report dated Nov. 4, 2022 (4 pages) from PCT Priority Application PCT/EP2022/066077 filed Jun. 14, 2022.
　　(Continued)

*Primary Examiner* — Stephen P Avila
(74) *Attorney, Agent, or Firm* — Capitol City TechLaw

(57)　　　　　　ABSTRACT

A surfboard including a surfboard body and having an upper surface and a bottom surface, an upwardly open cavity formed in the upper surface, an electric drive for propelling the surfboard, a battery housing having an upper face and being connected with the electric drive for supplying electrical energy, the upper face having a recess extending between opposite side faces of the battery housing, the battery housing being removably received in the cavity. A bracket handle with a central portion and opposite side portions defining arms pivotally mounted to the battery
　　(Continued)

housing to allow turning of the bracket handle between a carrying position for carrying the battery housing when removed from the cavity and a second position wherein the central portion is nested within the recess. The battery housing having a latching portion in releasable engagement with the central portion when nested within the recess.

20 Claims, 6 Drawing Sheets

(51) Int. Cl.

| | | |
|---|---|---|
| *B63B 32/10* | (2020.01) | |
| *B63B 32/40* | (2020.01) | |
| *B63B 32/50* | (2020.01) | |
| *B63H 21/17* | (2006.01) | |
| *H01M 50/249* | (2021.01) | |
| *H01M 50/256* | (2021.01) | |
| *H01M 50/262* | (2021.01) | |

(52) U.S. Cl.
CPC ............. *B63B 32/50* (2020.02); *B63H 21/17* (2013.01); *H01M 50/249* (2021.01); *H01M 50/256* (2021.01); *H01M 50/262* (2021.01); *B60L 2200/32* (2013.01); *H01M 2220/20* (2013.01)

(58) Field of Classification Search
CPC ............. H01M 50/249; H01M 50/262; H01M 50/256; H01M 2220/20; B63H 21/17
See application file for complete search history.

(56) References Cited

U.S. PATENT DOCUMENTS

| | | | |
|---|---|---|---|
| 11,518,267 | B2 | 12/2022 | Weisenburger et al. |
| 11,535,341 | B2 | 12/2022 | Weisenburger |
| 2003/0022545 | A1 | 1/2003 | Heidenreich et al. |
| 2010/0136425 | A1 | 6/2010 | Gau et al. |
| 2021/0024178 | A1 | 1/2021 | Weisenburger |
| 2021/0114695 | A1 | 4/2021 | Weisenburger et al. |

FOREIGN PATENT DOCUMENTS

| | | |
|---|---|---|
| CN | 112467274 A | 3/2021 |
| DE | 20 2017 107818 U1 | 2/2018 |
| KR | 10-2017-0000622 A | 1/2017 |
| WO | WO 2019/122087 A1 | 6/2019 |
| WO | WO 2019/122091 A1 | 6/2019 |

OTHER PUBLICATIONS

International Report on Patentability (1 page) dated Dec. 14, 2023 and appended Written Opinion dated Nov. 4, 2022 (9 pages) from PCT Priority Application PCT/EP2022/066077 filed Jun. 14, 2022.
Office Action dated Feb. 9, 2022 from Swedish priority Application No. 2150861-9 (7 pages).

* cited by examiner

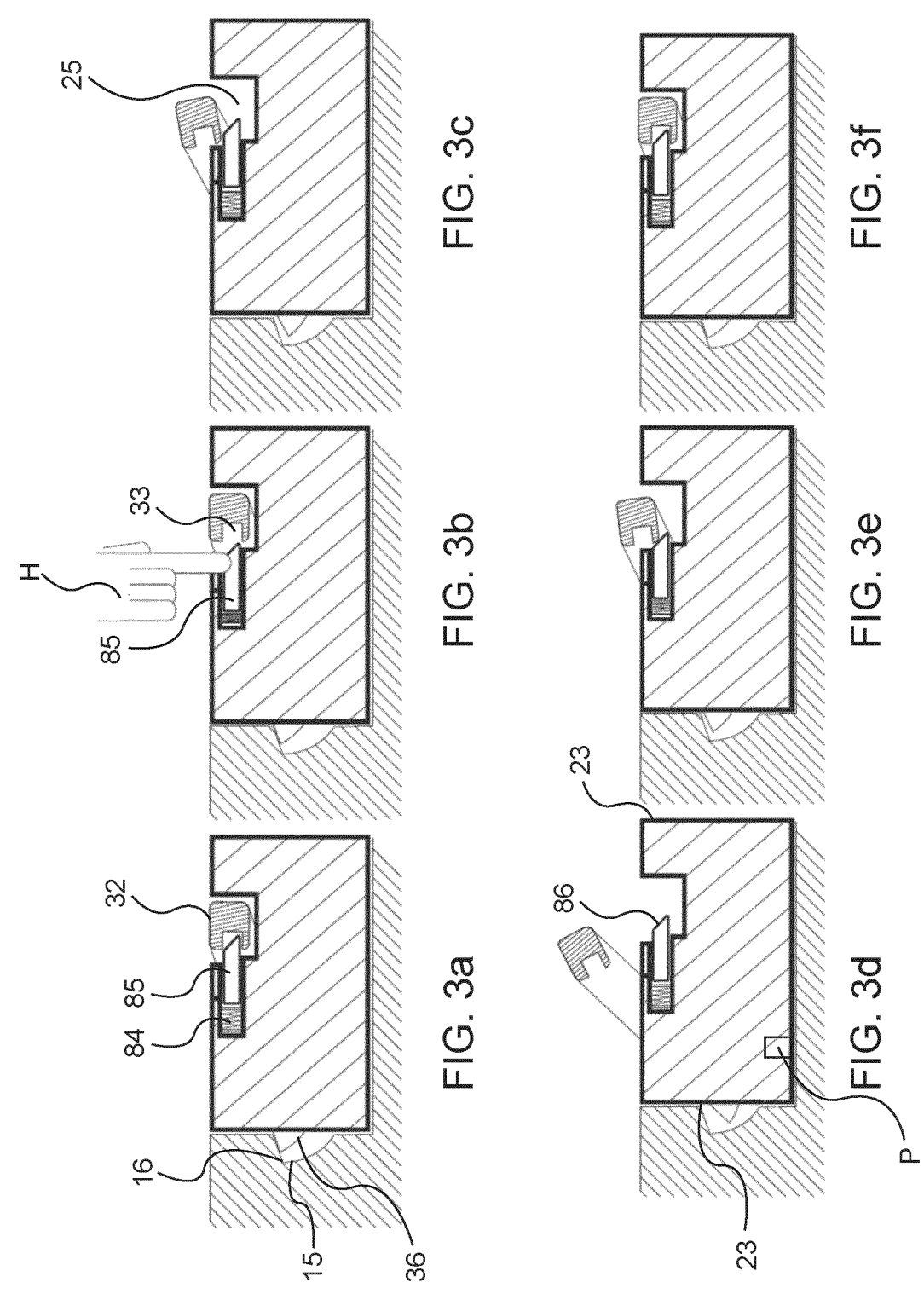

ELECTRICALLY POWERED SURFBOARD, AND A SURFBOARD BATTERY HOUSING

This application is a National Stage application of International Application No. PCT/EP2022/066077, filed Jun. 14, 2022, the entire contents of which are incorporated herein by reference.

This application claims priority under 35 U.S.C. § 119 (a) to 1) Swedish Patent Application No. 2150861-9, filed on Jul. 1, 2021, and 2) Swedish Patent Application No. 2250391-6, filed on Mar. 30, 2022, the entire contents of each of which are incorporated herein by reference.

BACKGROUND OF THE INVENTION

Field of the Invention

The invention relates to an electrically powered surfboard and a battery housing for an electrically powered surfboard.

Description of the Related Art

Surfboards are boards which normally do not have a sail and on which a surfer can ride. Powered surfboards can be used in bodies of water which have little surf. The electric drive of powered surfboards is supplied with power by a battery arranged in the body of the surfboard. For charging, the battery, which is contained in a battery housing, is removed from the body of the surfboard.

KR2017 0000622 discloses an electrically powered, water jet-propelled surfboard with a separate elongated battery housing having a bracket which is turned down to a horizontal position for securing the battery housing to the surfboard within a dedicated recess. The bracket has a central portion and opposite side portions that are each pivotally connected to the battery housing.

WO2019/122087 and WO2019/122091 disclose an electrically powered, water-jet propelled surfboard with a separate elongated battery housing received in an elongated cavity of the surfboard. A bracket is connected to the battery housing and has a central portion and opposite side portions that are each pivotally connected to the shorter sides of the battery housing. The pivotal connection is such that the bracket turns about an axis of rotation that extends halfway between the longer sides of the battery housing. The bracket serves two functions, namely as a handle and to secure the battery housing to the surfboard inside the cavity. For the latter purpose the side portions of the bracket have projections that receive and engage with a respective pin arranged in the cavity halfway between the longer sides of the cavity. When a user holding on to the central portion turns the bracket down to a horizontal position, after having inserted the battery housing into the cavity from above, engagement is established between the pins and the projections to secure the battery housing to the surfboard within the cavity. In its horizontal position is the bracket nested within a dedicated recess formed in the battery housing along with or near one of its longer sides. The central portion of the bracket extends above the major surface of the battery housing when the bracket is used as a handle.

U.S. Ser. No. 10/946,939 discloses an electrically powered, water-jet propelled surfboard with a separate elongated battery housing received in an elongated cavity of the surfboard. The battery housing has a narrow nose portion at one end, which nose portion has on its lower side a plug for establishing electrical connection with the battery housing. A bracket is connected to the nose portion and has a central portion and opposite side portions that are each pivotally connected to the sides of the nose portion. The pivotal connection is such that the bracket turns about an axis of rotation that extends between the sides of the nose portion, near the end of the battery housing. The bracket serves two functions, namely as a handle and to secure the battery housing to the surfboard inside the cavity. For the latter purpose the side portions of the bracket have a track that receive and engage with a respective pin arranged in a narrow portion of the cavity that receives the nose portion. When a user holding on to the central portion turns the bracket down to a horizontal position, after having inserted the battery housing into the cavity from above, engagement is established between the pins and the projections to secure the battery housing to the surfboard within the cavity. In its horizontal position is the central portion of the bracket nested within a dedicated recess formed in the narrow portion of the cavity. The central portion of the bracket extends along the side of the nose portion when the bracket is used as a handle.

It is preferred that accidental disengagement of the battery housing from the surfboard body does not occur as this may lead to an immediate loss of electrical contact with the electric drive whereby the user of the surfboard may lose control over the surfboard, Such a disengagement may result from even minor deformations of the surfboard body during use, which deformations may lead to a relative movement between the aforementioned tracks and pins, thereby turning the bracket.

It is also a problem with the aforementioned surfboards that to allow a user to get a good grip with his hand around the central part of the bracket for moving it upwards away from its nested horizontal position, the dedicated recess in the cavity needs to be relatively wide; alternatively, an upwards projecting finger grip must be provided. There is also a risk a toe of a person standing on the surfboard may get caught in this dedicated recess or by the finger grip.

There exists a need for an improved electrically powered surfboard addressing amongst others the above discussed risks or problems associated with the prior art surfboards. There is also a need for a surfboard battery housing that is easier to handle.

SUMMARY OF INVENTION

It is an object of the invention to provide an electrically powered surfboard addressing amongst others at least some of the above discussed problems with the prior art surfboards.

This object, and other objects, are achieved by a surfboard, including a battery housing with a bracket handle and a recess with a handle lock/latch, and also by a surfboard battery housing, having an upper face designed to form a part of the surface on which a person stands when using the surfboard and which is oriented vertically when the battery housing is carried. In the battery housing disclosed in WO201 9/122087 the battery housing is carried with its two opposite major faces oriented horizontally.

Preferred embodiments are defined in the description. Among others, a biasing force may preferably be provided for moving the bracket handle out of the recess when the latch/lock is disengaged, to allow a user to grip around it, whereby the recess may be relatively narrow.

The battery housing may be directly connected to electric circuitry of the electric drive via directly interfacing plugs and sockets, preferably arranged on the bottom of the battery housing and the top of the electric drive.

BRIEF DESCRIPTION OF THE DRAWINGS

FIG. 1b is an exploded view of the surfboard of FIG. 1a,

FIGS. 3a-3f are side cross-sectional views showing both the latching of the battery housing bracket handle and the engagement of the battery housing engagement portion with the surfboard body, as the bracket handle is turned.

DETAILED DESCRIPTION

The invention will now be explained in more detail below by reference to preferred embodiments; like numerals are used herein to refer to identical or similar components.

Figure 1A:
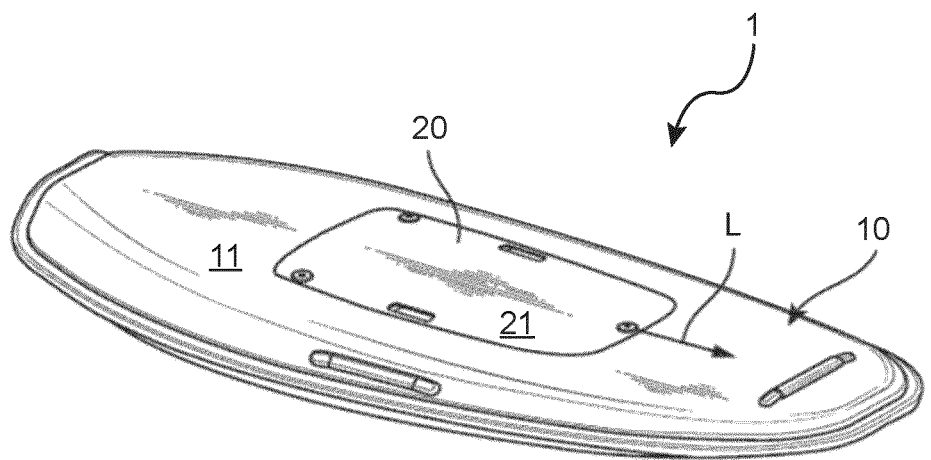
FIG. 1a is a perspective view of a prior art surfboard.
Figure 1B:
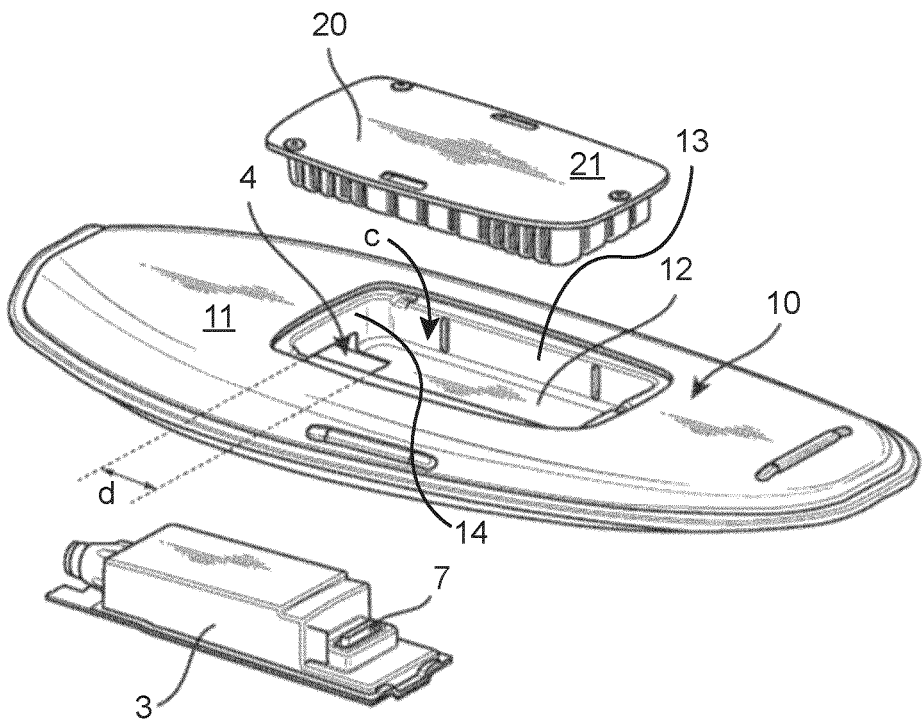

FIGS. 1a and 1b show a schematic perspective view of a known surfboard 1 including a body 10 having an upper surface 11 and an opposite lower surface. Letter L denotes a longitudinal direction of the surfboard body 10.

A battery housing 20 including therein a battery has an upper, first major face 21 which generally is flush with the upper surface 11 of the body 10 when the battery housing 20 is positioned as shown inside an upwardly open cavity C formed in the body 10 of the surfboard 1. The upper face 21 defines together with the upper surface 11 of the body 10 a surface on which a user stands when using the surfboard 1. For this purpose the battery housing 20 may have a coating providing friction, such as a rubber coating, preferably a soft rubber coating.

The battery needs to be charged at regular intervals, and for this the battery housing 20 is removed from the cavity C. After the battery has been charged the battery housing 20 is reinserted into the cavity C from above and brought to rest against the bottom surface 12 of the cavity C.

A lower, second major face of the battery housing 20, which second major face is opposite the aforementioned first major face 21, has a connector (not shown) configured for direct electrical connection with a plug 7 which is part of an electric drive 3. Two opposite long side faces 22 and two opposite short side faces 23 extend between the two opposite first and second major faces 21.

The electric drive 3 may be a jet drive that has a water inlet on the underwater, lower surface of the surfboard 1 as well as a water channel, a nozzle at the rear end of the water channel and a rotor which is connected by means of a drive train to the electric drive 3 and during rotation pushes water towards the rear through the water channel, which then sprays out through the nozzle contrary to the direction of travel and thus gives the surfboard 1 the necessary forward propulsion.

The present invention provides an improvement in the way a battery housing 20 may be secured to a surfboard body 10 inside a corresponding cavity C.

Figure 2A:
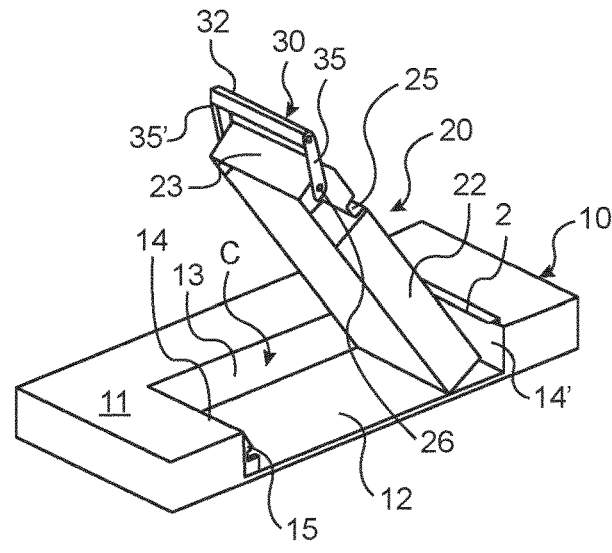
FIGS. 2a-c are perspective sectional views showing a battery housing component being inserted into a surfboard body component of the surfboard of the invention.
Figure 2B:
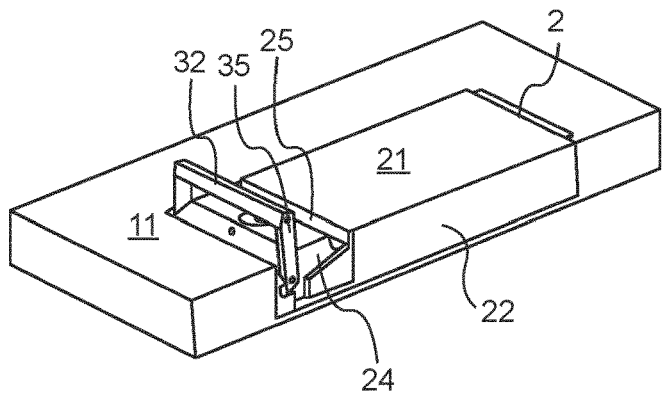

Turning now to FIG. 2a shown is a cut-out section of a body 10 of a surfboard 1 of the present invention. The drawing is a sectional view in that only one of a pair of opposite long side walls 13 of the cavity C is shown to allow the battery housing 20 of the surfboard as well as a projection 16 to be seen. The projection 16, seen best in FIG. 2c, is one of a pair of projections 16 arranged along one of a pair of opposite short side walls 14, 14' of the cavity C.

As seen, in contrast to the battery housing of FIG. 1 the battery housing 20 of the surfboard 1 of the invention has a bracket handle 30. The bracket handle 30 has a central portion 32 and two opposite side portions defining arms 35, 35'. The arms 35, 35' are pivotally connected to the two opposite long side faces 22 of the battery housing 20 via connections 26 to define an axis A of rotation of the bracket handle 30. The bracket handle 30 is illustrated in FIG. 2a being in a carrying position wherein the battery housing 20 may be carried by a person with the face 23 oriented vertically, in which position the central portion 32 of the bracket handle 30 extends along one of the two opposite short side faces 23 of the battery housing 20; the two short side faces 23 are shorter than the two long side faces 22, and the side faces 22, 23 have a height that defines the thickness of the battery housing 20. In the carrying position there is a distance between the central portion 32 and the adjacent short side face 23 to allow a person to grip around the central portion 32 with his hand; preferably, in the carrying position the two arms 35, 35' extend in continuation of the two long side faces 22 (cf. FIGS. 6b and 7b).

Figure 2C:
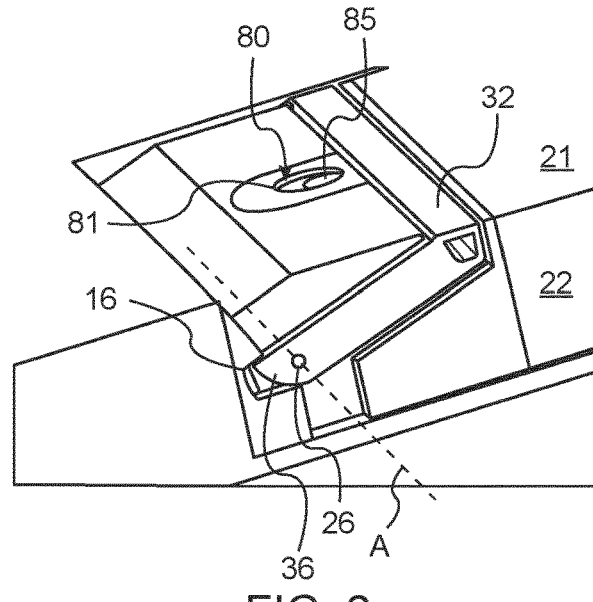

At their ends, the two arms 35, 35' each have an engagement portion 36 engaging a lower face of the respective projection 16 when the handle 30 is turned fully into a second, securing position that is shown in FIG. 2c, in order to secure the battery housing 20 to the body 10 inside the cavity C. FIGS. 2b, 2c and 4b-4d show steps sequentially carried out by a user in order to secure the battery housing 20 inside the cavity C.

As shown, the battery housing 20 is inserted into the cavity C with one end below a retaining projection 2 and with the bracket handle 20 in a position where the engagement portions 36 are located within the general contour of the battery housing 20. The bracket handle 20 is turned once the battery housing 20 rests against the bottom 12 of the cavity C, such that the engagement portions 36 are brought to extend into a respective opening 15 defined by the projections 16, on one side of the axis A of rotation. Since the dimensions of the battery housing 20 generally correspond to those of the cavity C the battery housing 20 is restricted from moving in the longitudinal direction L whereby the engagement portions 36 remain engaged with a respective projection 16, to thereby secure, together with the retaining projection 2, the battery housing 20 in the cavity C until the bracket handle 20 is turned back towards its carrying position.

Figures 4A, 4B, 4C, 4D, 5A, 5B, 5C, 5D:
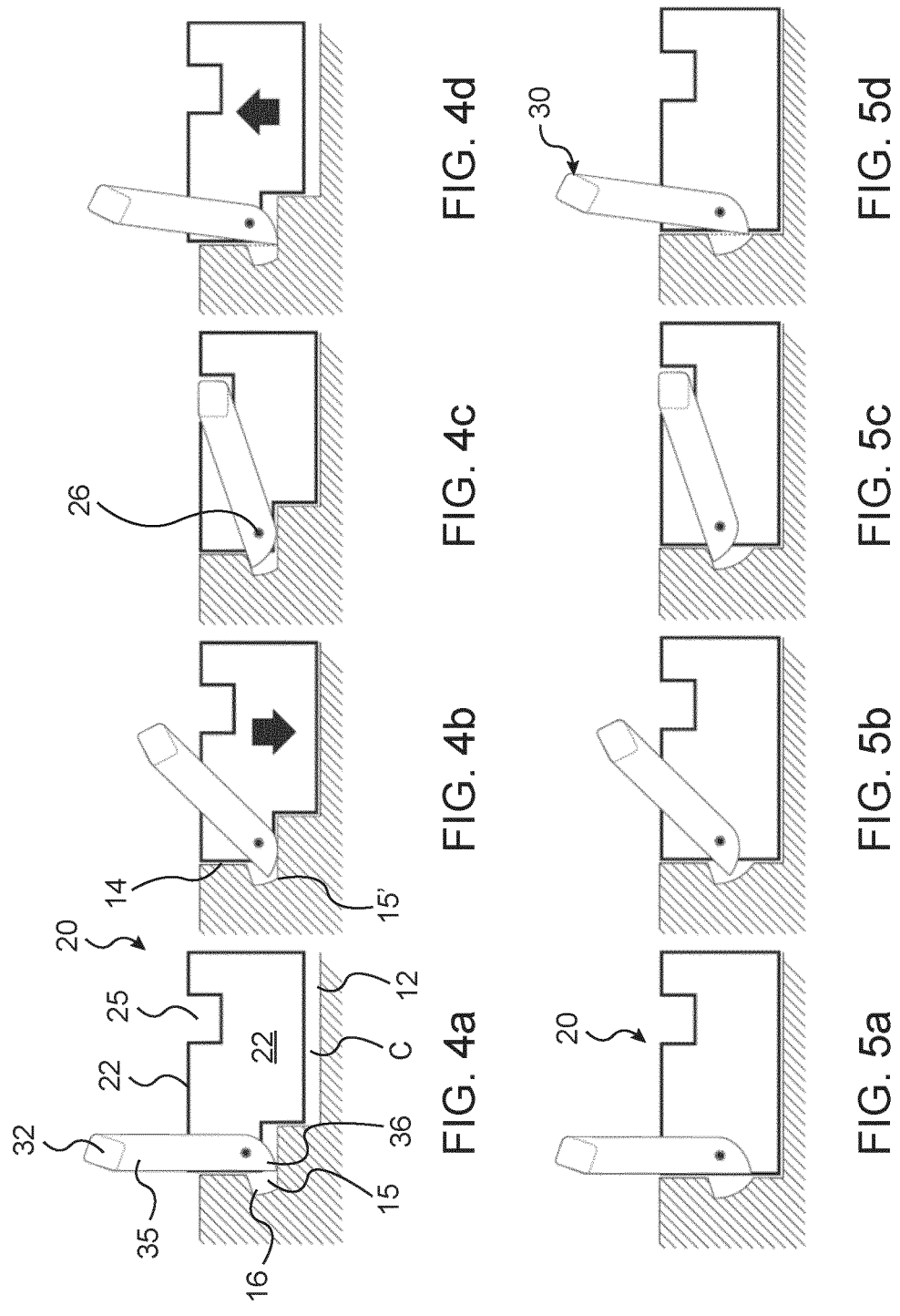
FIGS. 4a-4d are views similar to FIGS. 3a-3f, showing an alternative configuration of the engagement structure within the cavity that receives the battery housing, illustrating movement of the battery housing as the bracket handle is turned.
FIGS. 5a-5d are views similar to FIGS. 3a-3f, FIGS. 6a-6c show an alternative latching of the battery housing bracket handle as the bracket handle is turned.

It is noted here that in lieu of a projection 16 being mounted in the cavity C at the short side wall 14 of the cavity C, the short side wall 14 may be integrally formed with a respective opening 15 receiving an engagement portion 36, as shown in the alternative embodiment depicted in FIG. 4a. This may be preferred from a manufacturing point of view.

The design of the bracket handle 30 is such that when turned into the securing position shown in FIG. 2c the central portion 32 is at the same time received and nested within an upwardly open elongated recess 25 formed in the upper face 21 of the battery housing 20 between, and at some distance from, the two opposite short side faces 23, on the other side of the axis A and extending between the two opposite long side faces 22 of the battery housing 20.

Shown best in FIGS. 3a-3f is the battery housing having a lock in the form of a latch 85 with a displaceable latching portion 86 moving within the aforementioned battery housing 20 recess 25 and configured to automatically engage with the central portion 32 when the latter is moved to the nested position within the recess 25. The latch 85 is finger-operated as shown in FIG. 3b for disengaging the latch 85 from the central portion 32. As shown, the latch 85 is finger-accessible at the upper battery housing face 21 for disengagement of the latch 85 from the central portion 32, preferably via an access opening 81 formed in the upper face 21 next to the recess 25. The latching portion 86 is spring-biased by spring 84 towards an advanced position within the recess 25 to bring about the automatic engagement, and has a ramp face against which a portion of the bracket handle 22 rides when moving into the recess 25, see FIG. 3e.

Preferably, there is a biasing force on the handle bracket 30 oriented to raise the bracket handle 30 out of the recess 25 away from the nested position. For this the battery housing 20 may include a respective spring (not shown), such as at the connection 26 where the arms 35, 35' are pivotally mounted to the opposite long sides faces 22 of the battery housing 20; alternatively, the engagement between the arms 35, 35' and the body 10 may be such that elastic deformations arise due to compressive forces between the arms 35, 35' and the surfboard body 10, providing a biasing force that seeks to raise the bracket handle 30 out of the recess 25 when the latching portion 86 is disengaged from the central portion 32 of the bracket handle 30. This may be achieved through the design of the arms 35, 35' or by eg. arranging an elastomeric material in the opening 15 that receives the engagement portion 36. Alternatively, an elastomeric compressible body (not shown) may be arranged in the upper face recess 25, which body is compressed when the central portion 32 of the bracket handle 30 is introduced, and which remains in the compressed state until the latching portion 86 is disengaged. The biasing force provides the advantage that the recess 25 may be very narrow, following the exact geometry of the central portion 32, in that the central portion 32 is presented to the user outside the recess 25 when the latching portion 86 is disengaged from the central portion 36, at which point the user can then grip around the central portion 36 with his hand.

Shown in FIGS. 4a-4 is an embodiment of the invention where disengagement of the arms 35, 35' from the surfboard body 10 involves the arms 35, 35' riding on a surface 15' opposite the respective projection 16 to thereby raise the entire battery housing 20 out from the cavity C when the bracket handle 30 is turned.

The aforementioned latch 85 may serve two functions, namely to keep the bracket handle 30 in place and to maintain engagement between the arms 35, 35' and the surfboard body 10 even where deformations of the body 10 seeks to disengage the engagement portions 36.

Figure 6C:
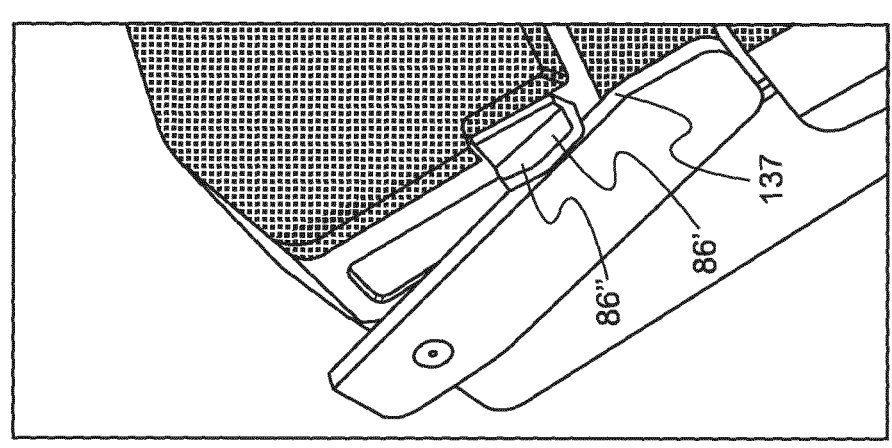
Figure 6B:
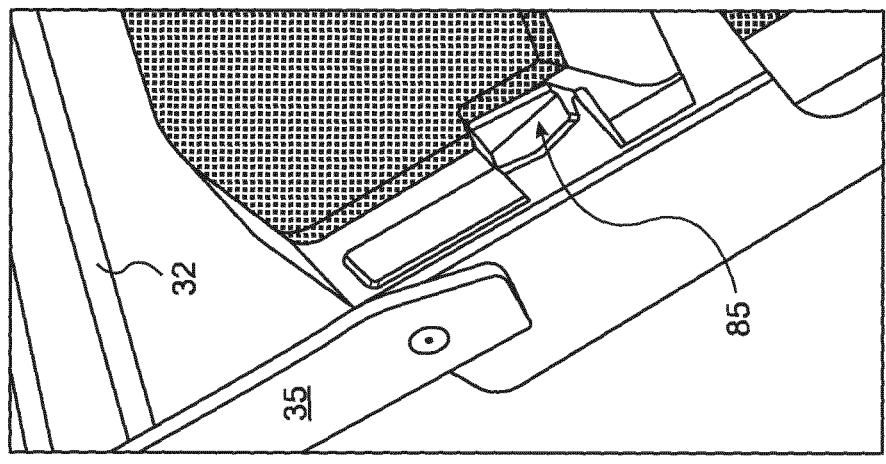
Figure 6A:
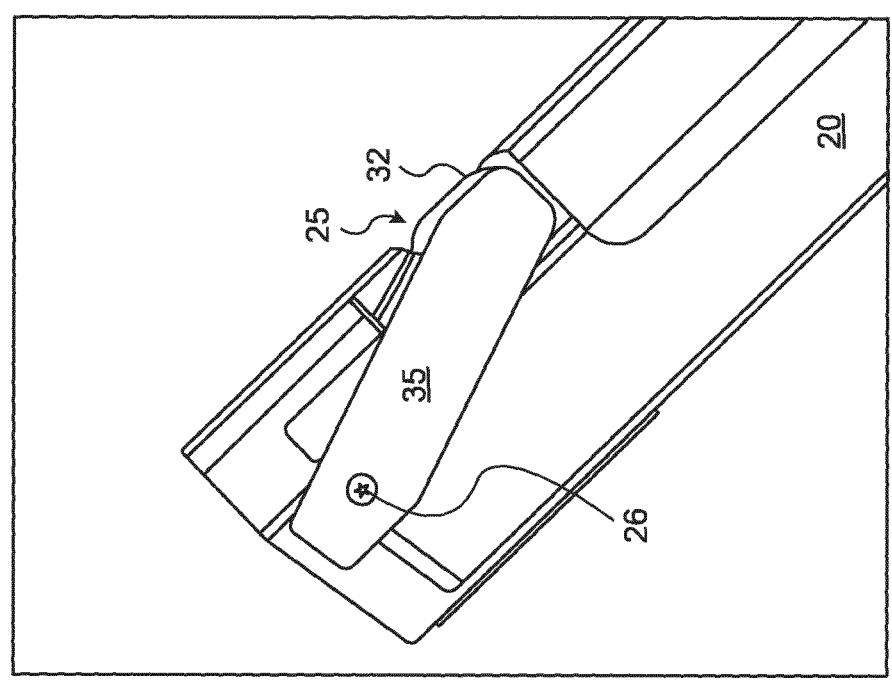
Figure 7C:
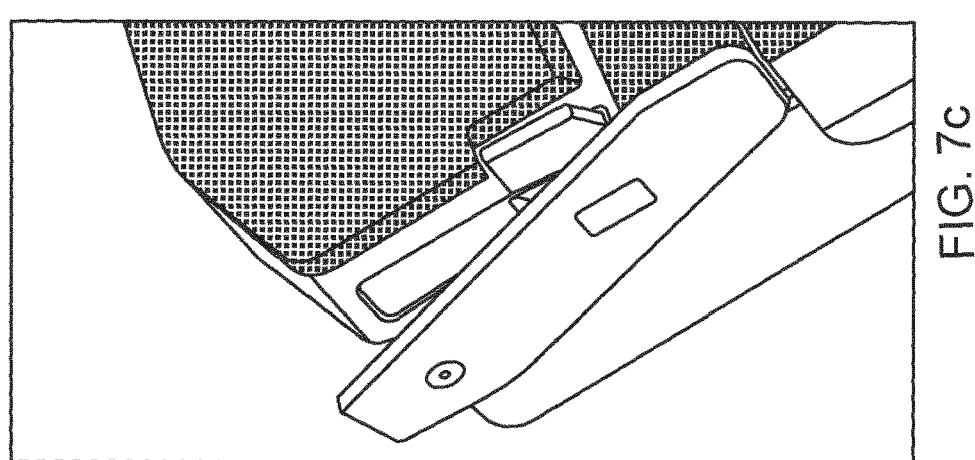
FIGS. 7a-7c show yet a further latching of the battery housing bracket handle as the bracket handle is turned.
Figure 7B:
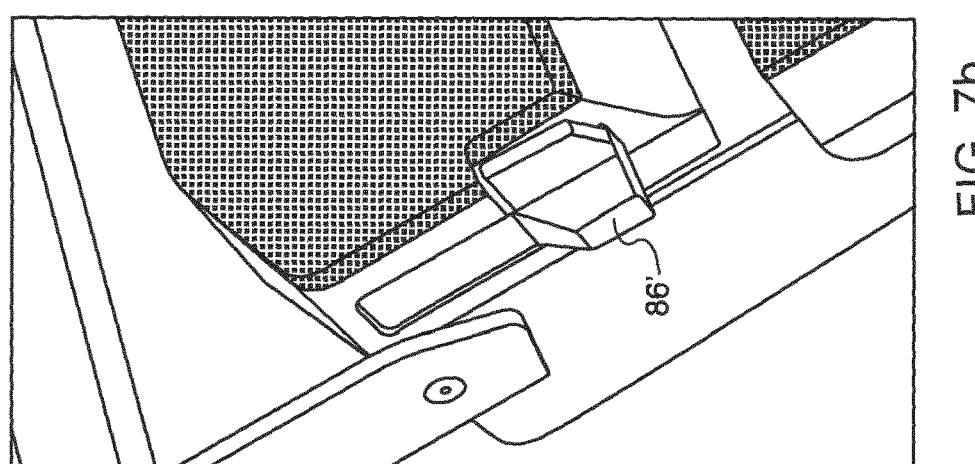
Figure 7A:
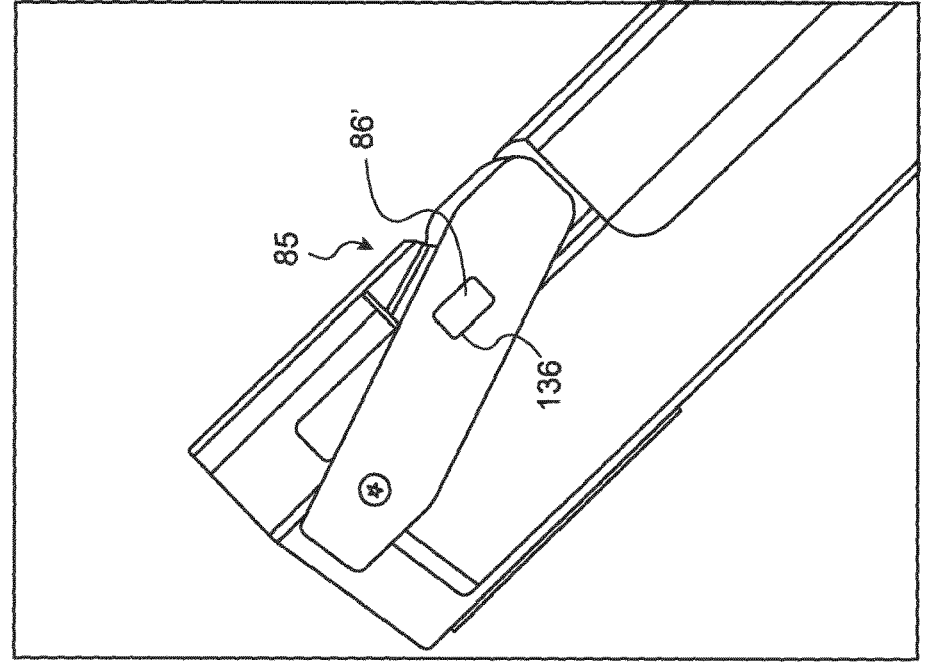

FIGS. 6a-6c and 7a-7c show an alternative lock for releasably engaging the bracket handle 30 when the bracket handle 30 has reached its position with its central portion 32 nested within the recess 25. In both embodiments is a latching portion 86' of the lock 85 formed as a flexible tab mounted to one of the long side faces 22 of the battery housing 20. When the bracket handle 30 is in this position the latching portion 86' may be pressed manually inwardly, to thereby deflect elastically out of engagement with a portion of one of the arms 35, such as either an upper edge 137 of the arm 35 as shown in FIG. 6c or a through-going aperture 136 formed in the arm 35, as shown in FIG. 7a, for release of the handle 30. A similar lock 85 may be arranged on the opposite long side face 22. Shortly before the handle 30 has reached the position shown in FIGS. 6a, 6c, 7a and 7c the arm 35 rides on a ramp 86″ of the latching portion 86' to temporarily deflect the latching portion 86' inwards, before it springs back, into engagement with the upper edge 137/the aperture 136. As before, a spring may be provided to turn the handle 30 after disengagement with the latch 86, whereby a user may grip around the central portion 32.

It is noted that the invention broadly, whether or not a lock as described above is used, allows for a surfboard battery housing 20 to be carried with its two opposite major faces 21 extending vertically and, hence, easier handled than the battery housing disclosed in WO2019/122087 where the battery housing is carried with its two opposite major faces oriented horizontally.

A variant of a powered surfboard 1 battery housing 20 has a first major face 21, which preferably defines a surface portion of the surfboard on which a person may stand when using the surfboard, and an opposite second major face, the first major face having a recess 25 extending between opposite short side faces of the battery housing 20, a bracket handle 30 with a central portion 32 and opposite side portions defining arms 35, 35' pivotally mounted to the two short side faces, to allow the bracket handle 30 to be turned about an axis A of rotation between a battery housing 20 carrying position in which the central portion 32 extends alongside a long side face of the battery housing 20, along with and on one side of the axis A of rotation, and a second position wherein the central portion 32 is nested within the recess 25, wherein in the carrying position there is a distance between the central portion 32 and the long side face to allow a person to grip around the central portion 32 with his hand, and wherein the recess 25 is located on the other side of the axis A of rotation. This variant also allows for the battery housing 20 to be carried with its two opposite major faces 21 extending vertically and, hence, easier handled than the battery housing disclosed in WO2019/122087 where the battery housing is carried with its two opposite major faces oriented horizontally.

An electrical connector (plug/socket) P for connection with an electric drive 3 of the surfboard may be arranged on or within any one of the first or second major faces 21, or long or short faces 22, 23, opposite to and for electrical connection with an electric plug/socket 7 of the electric drive, engagement of the two plugs/sockets P, 7 with one another being established on insertion of the battery housing into the surfboard cavity C.

The invention claimed is:

1. A surfboard comprising:
   a surfboard body extending along a longitudinal direction and comprising an upper surface and an opposite bottom surface;
   an upwardly open cavity formed in said upper surface;
   an electric drive for propelling said surfboard;
   a battery housing comprising an upper face and being connected with said electric drive for supplying electrical energy, wherein said upper face has a recess extending between opposite side faces of said battery housing and said battery housing being removably received in said cavity;
   a bracket handle comprising a central portion and opposite side portions defining arms pivotally mounted to said battery housing to allow turning of said bracket handle between a carrying position for carrying said battery housing when removed from said cavity and a second position wherein said central portion is nested within said recess;

wherein said battery housing comprising a latch comprising a latching portion in releasable engagement with said bracket handle when said central portion is nested within said recess; and wherein a portion of one or both of said arms is releasably engaged with said surfboard body in said second position to prevent removal of said battery housing from said cavity.

2. The surfboard of claim 1, wherein said latching portion is in releasable engagement with said central portion when said central portion is nested within said recess.

3. The surfboard of claim 2 wherein said latching portion is movable within said recess, said latch being finger-operated for disengaging said latch from said central portion.

4. The surfboard of claim 2, said latch being accessible at said upper face for disengagement of said latch from said central portion.

5. The surfboard of claim 2, said latching portion being biased towards an advanced position within said recess.

6. The surfboard of claim 1, wherein said latching portion is in releasable engagement with one of said arms when said central portion is nested within said recess.

7. The surfboard according to claim 6, wherein said latching portion is received in a through-going aperture of said one of said arms when said central portion is nested within said recess.

8. The surfboard according to claim 6, wherein said latching portion is in releasable engagement with an edge of said one of said arms when said central portion is nested within said recess.

9. The surfboard according to claim 1, said latching portion comprising a ramp face against which a portion of said bracket handle rides when being inserted into said recess.

10. The surfboard of claim 1, wherein a projection is arranged within said cavity, wherein a portion of one said arms is engaged with a lower face of said projection when the bracket handle is turned towards said second position, to establish said releasable engagement with said surfboard body.

11. The surfboard of claim 1, wherein a side wall of said cavity comprising an opening, wherein said portion of one of said arms is engaged with said opening when said bracket handle is turned towards said second position, to establish said releasable engagement with said surfboard body.

12. The surfboard according claim 1, wherein said releasable engagement with said surfboard body provides a biasing force moving said bracket handle out of said recess when said latch is disengaged.

13. The surfboard according to claim 1, wherein said bracket handle is spring-loaded, to provide a biasing force moving said bracket handle out of said recess when the latch is disengaged.

14. The surfboard according to claim 1, wherein said releasable engagement with said surfboard body is established at a cavity side wall extending along an axis of rotation and on one side of said axis of rotation, and wherein said recess is located on another side of said axis of rotation.

15. A powered surfboard battery housing comprising:
a first major face and an opposite second major face;
said first face having a recess extending between opposite long side faces of said battery housing;
a bracket handle comprising a central portion and opposite side portions defining arms pivotally mounted to said long side faces, to allow said bracket handle to be turned about an axis of rotation between a battery housing carrying position in which said central portion extends alongside a short side face of said battery housing, along with and on one side of said axis of rotation, and a second position wherein said central portion is nested within said recess;
wherein in said carrying position there is a distance between said central portion and said short side face to allow a person to grip around said central portion with a hand of said person; and
wherein said recess is located on another side of said axis of rotation.

16. The battery housing according to claim 15, comprising a lock for releasably locking said bracket handle against said turning when said bracket handle is in said second position wherein said central portion is nested within said recess.

17. The battery housing of claim 16, said lock being a latch comprising a latching portion in releasable engagement with said central portion when said central portion is nested within said recess.

18. The battery housing according to claim 16, said lock being a latch comprising a latching portion, wherein said latching portion is in releasable engagement with one of said arms-when said central portion is nested within said recess.

19. The battery housing according to claim 15, wherein said bracket handle is spring-loaded, to provide a biasing force moving said bracket handle out of said recess when said lock is disengaged.

20. The battery housing according to claim 15, said first face configured to define a surface on which a user stands when using a surfboard.

* * * * *